Sept. 29, 1953
R. H. WESTERGAARD
2,653,957
CONTINUOUS EXTRACTION OF OIL FROM VEGETABLE MATERIALS
Filed June 28, 1951
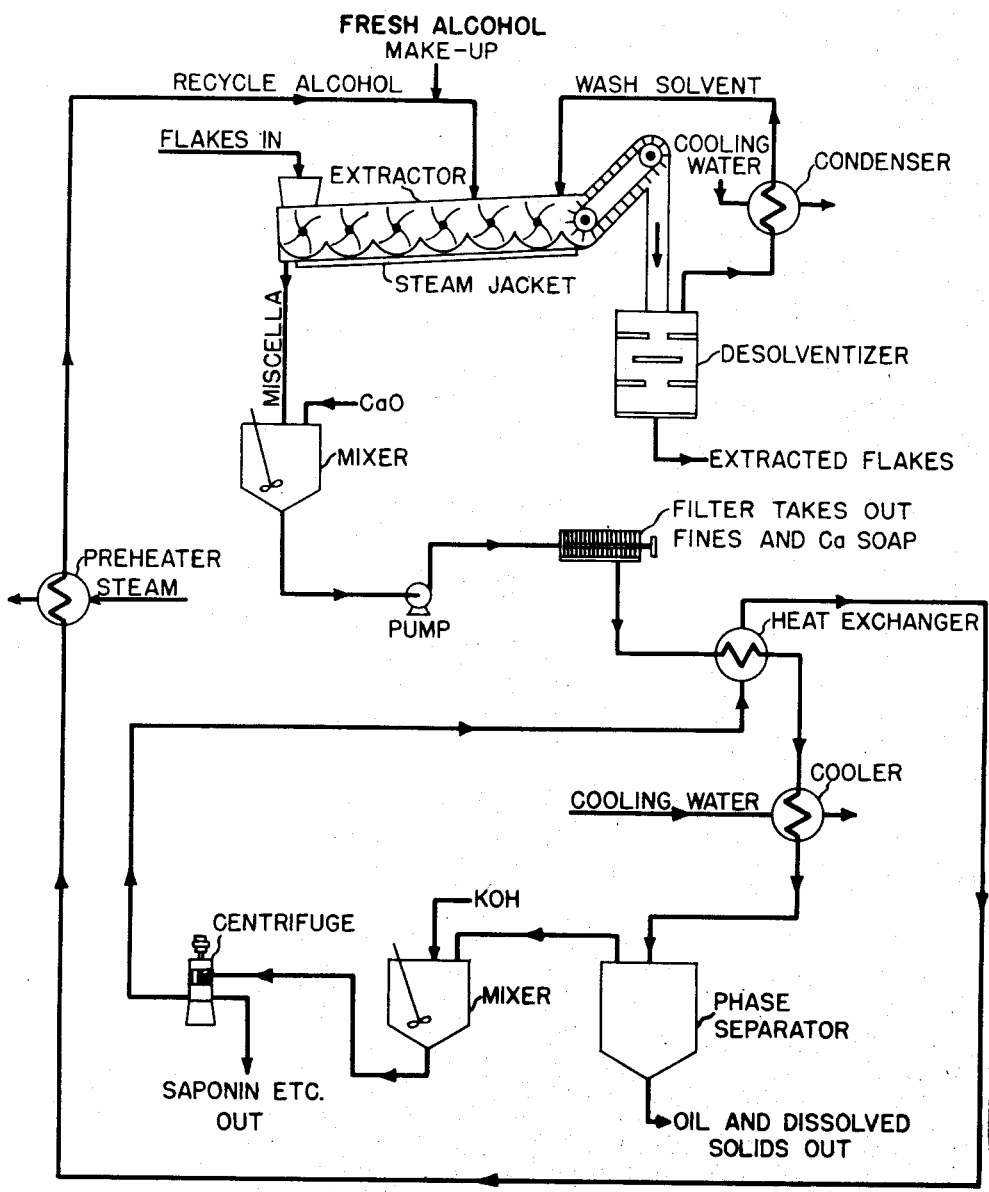
INVENTOR
RICHARD H. WESTERGAARD Patented Sept. 29, 1953

2,653,957

UNITED STATES PATENT OFFICE 2,653,957

CONTINUOUS EXTRACTION OF OIL FROM VEGETABLE MATERIALS

Richard H. Westergaard, Peoria, Ill., assignor to the United States of America as represented by the Secretary of Agriculture Application June 28, 1951, Serial No. 240,825

8 Claims. (Cl. 260—412.4)

The invention herein described may be manufactured and used by or for the Government of the United States of America for governmental purposes throughout the world without the payment to me of any royalty thereon.

This invention relates to a novel and improved method for extracting fatty oils and waxy solids from vegetable materials, such as the seeds and nut meats group comprising soybeans, cottonseed, flaxseed, peanuts, tung nuts, babassu meats, coconut meats, oiticica seed, wheat germ, corn germ, rapeseed, safflower seed, and sunflower seed.

The invention relates to improvements in the solvent extraction of vegetable seeds and nut meats involving the use of a solvent having a relatively high oil solvency at temperatures near the solvent's boiling point and a relatively low oil solvency at appreciably lower temperatures, so that oil and other material may be separated from solutions in the solvent by cooling. Examples of such solvents are ethyl alcohol, isopropyl alcohol, acetone-water mixtures, and the like.

In particular, this invention relates to the process for extracting the oils with a lower alcohol, such as ethyl alcohol, isopropyl alcohol, and the like, in a continuous process and refining the alcoholic miscella by cooling, and novel alkaline treatments so as to permit repeated use of the alcohol and avoid the necessity for a distillation step.

In United States Patent No. 2,445,931, a method is described for a continuous alcohol extraction of such vegetable materials as enumerated above in which the material is subjected to hot alcohol and the extract cooled until oil separates, cooled further until a fraction of waxy solids separate. The alcoholic solvent is then re-used without distillation refinement for further extraction of material. As described in the patent, the two cooling steps may be combined to cause removal of the oil and soilds together. The process has become known as the "non-distillation" process.

The mechanics of extraction in the non-distillation process are such that when a solvent has been re-used a number of times the concentration of dissolved materials remains constant. The recycled alcohol, however, although bearing the constant amount of dissolved solids, is an efficient solvent for oil from the vegetable material.

According to my invention, I introduce steps integral with the non-distillation process, whereby the quality of extracted oil is greatly improved. I have discovered that the alcoholic solvent, either before or after separation of the oil and solid material by cooling, may be treated by relatively simple procedures, and that the effect of my treatments reduces the free fatty acid and non-oleaginous content of the final oil. The resulting oil is of semi-refined quality, even upon prolonged operation of the process.

I have discovered that the alcohol, even after it is essentially freed from oil and waxy solids material by refrigeration in accordance with the aforementioned patent, i. e., the recycle alcohol, contains an appreciable quantity of free fatty acids and non-oil substances, dissolved from the oleaginous material together with the oil. These materials, not removed by the refrigeration separation as described in the patented process, do not appear to affect the solubility of the oil and waxy solids. I have discovered, however, that this recycle alcohol can be treated to remove a substantial portion of these said materials, and when so, the alcohol is capable of producing a final oil product of greatly improved quality. Moreover, I have discovered that alkaline treated alcohol is a more efficient solvent for extraction of oil, and that the alkalinity may be residual alkalinity from an alkali metal hydroxide treatment of recycle alcohol or it may be added as an alkali metal hydroxide pretreatment of the solvent alcohol entering the extractor.

My inventive methods are based upon my discoveries that the miscella or the recycle alcohol may be treated with alkaline materials to remove impurities which heretofore have been recycled with the alcoholic solvent. As will be explained, the alkaline treatment may be one or either of two general kinds, each of which results in the separation of a particular kind of constituent, as an insoluble substance, which may be removed from the recycle alcohol by simple filtration or centrifuging steps.

Utilizing my discoveries I have integrated alkaline treatment and corresponding separation steps with the non-distillation process and have found that the resulting extracted oil is remarkably low in free fatty acid content and is of semi-refined quality.

In my first general kind of alkaline treatment I introduce an alkaline earth metal oxide or hydroxide, such as calcium oxide or hydroxide. In the overall process it is important to avoid introducing water into the system, and for this reason the alkali added should be either an alcoholic solution or in dry form. Dry alkaline earth metal hydroxide may be used in my treatment, but the dry oxide is preferred for the above reason. By reason of its cheapness and availability, lime, i. e., calcium oxide or hydroxide, is preferred. The lime may be added in sufficient amount to neutralize the free fatty acids contained in the recycle alcohol or in slight excess. The treatment results in the precipitation of the alkaline earth metal soaps of the fatty acids which may be separated from the liquid by filtration or other suitable means. However, the amount of excess should be kept to a minimum in order to minimize saponification of neutral oil and loss of entrained oil from either the miscella or the recycle alcohol.

The reaction between alkaline earth metal oxide and the free fatty acids in the recycle alcohol is rather slow at room temperature. It is preferred that the treatment be carried out at elevated temperature, i. e., within the range of 50° C. to 78° C. This may be done by treating the hot miscella as it comes from the extraction unit; or, by treating the preheated recycle alcohol just before it is re-used. The accompanying drawing illustrates schematically the latter variation of my process.

My other alkaline treatment comprises the addition of an alkali metal hydroxide to the recycle alcohol. This may be done as a single separate treatment or may be combined with the alkaline earth metal oxide treatment, occurring either prior to, subsequent to, or in substantial simultaneous combination therewith. The action of an alkali metal hydroxide, such as sodium or potassium hydroxide, upon the recycle alcohol causes the separation of appreciable amounts of non-oleaginous materials. These materials are not essentially insoluble soaps, but are rather mixtures of carbohydrate material, saponin material, and other materials of undetermined nature.

The treatment with alkali metal hydroxide may be one essentially devoted to the recovery of the non-oleaginous materials previously described, or it can be carried out as essentially a means for purifying the recycle solvent. Of course, in either case, the insoluble material may be suitably recovered. However, in the first case, it can be carried out on a bled-off portion of the recycled solvent. This is frequently desirable, for it enables the use of smaller equipment for the treatment step, reduces alkali consumption due to the total excess used, and the insolubles are more easily handled. The precipitate is removed from the treated stream of alcoholic solvent, and the solvent may then be led back to the extraction system. The amount of alkali metal hydroxide used in such a case may vary from 0.5 to 3.0 grams per liter.

When the entire recycle alcohol is treated, as in the latter case, about 0.1 to 0.5 grams of alkali metal hydroxide per liter are required. It is convenient to determine the amount within this range, by trial and error for any given continuous operation. This may be done by determining the minimum amount of alkali metal hydroxide required for complete precipitation of the insolubles. The amount will remain fairly constant for any given set of operating conditions. In any of the two types of treatments outlined for alkali metal hydroxide, it is preferable to carry out the treatment at reduced temperatures, say at temperatures not higher than 40° C.

Inasmuch as the alkali metal hydroxide treatment does not remove free fatty acids as insouble soaps, it is preferred to incorporate my two novel alkaline treatments as steps in the overall extraction process. Each is somewhat independent of the other as to the actual carrying out of the step, yet the two coact to produce a high-quality extracted oil remarkably low in free fatty acids. For example, the recycle alcohol may be treated with the alkali metal hydroxide as the cool recycle alcohol leaves the phase separator, as shown in the accompanying drawing. After alkali metal hydroxide treatment, the recycle alcohol may be subsequently limed.

The insoluble material resulting from each step may be recovered separately by centrifugation or filtration steps, or the two different products may be recovered together in a combined filtration step. A treatment which I prefer, however, is first to lime the hot miscella, removing the insoluble calcium soaps together with the fines by filtration. This is particularly convenient, since it is customary to place a filter at this point in the process for the separation of the fines. The limed miscella may then be cooled, oil and other material removed in the phase separator, and the recycle solvent then given the alkali metal hydroxide treatment.

My lime treatment is especially important in commercial adaptations of the "non-distillation" process. In such adaptations, it is customary to wash the spent flakes with fresh solvent before they leave the extraction unit in order to recover the maximum amount of dissolved oil. This washing step will cause free fatty acids to build up in the recycled solvent. Depending upon the particular nature of the raw flakes used, this will result in a free fatty acid content as high as 0.3-2 percent in the solvent and a constant high free fatty acid content of the produced oil, unless the acids are removed from the recycle solvent. On the other hand, if the spent flakes are not washed, they will carry out some of the free fatty acids to give a relatively reduced free fatty acid content of the recycled solvent. The practice of not washing the flakes hence results in reduced free fatty acid content of the final oil. The practice is undesirable economically, however, since the entrained recycle solvent carried with the spent flakes necessarily contains appreciable amounts of dissolved oil.

The following specific examples illustrate the invention.

Example 1

Miscella, coming hot from the alcoholic extraction of soybean flakes as described in United States Patent No. 2,445,931, is treated substantially immediately by the addition of 0.6 g. per liter dry calcium oxide. The lime and miscella mixture is maintained in a state of mild agitation at about 75° C. for a brief interval of time. This insures chemical contact between the lime and the free fatty acids present. The insoluble substances (i. e., the calcium soaps, fines, etc.) are then removed by filtration, and the clarified miscella is then led to the phase separator for separation of oil and other materials by cooling.

The recycle solvent emerging from the phase separator is treated at 15° C. with 0.2 g. per liter potassium hydroxide. The addition of the hydroxide is accompanied by a precipitation of insoluble substances which are removed by centrifugation. After treatment and separation of solubles, the recycle alcohol is then passed through a heat exchanger where the temperature is increased to that suitable for another extraction cycle. The free fatty acid content of the oil produced in this example is 0.03 percent.

In contrast to the results of the foregoing example, oil produced in a similar extraction, wherein there were no alkaline treatments, possessed a free fatty acid content of about 0.3 percent. Moreover, by another comparison, in continuous extractions, which likewise omit alkaline treatment and which include washing the spent flakes with fresh solvent, the free fatty acid content of the produced oil varies over a range of about 0.3–2.0 percent.

*Example 2*

In an experiment similar to Example 1, a sample of recycle alcohol was taken, and the sample treated with dry potassium hydroxide until no further precipitate was formed upon addition of potassium hydroxide after filtration. This treated recycle alcohol was compared analytically with untreated recycle alcohol. The total non-volatiles had decreased from 4.2 percent to 2.7 percent, and the residual solids had decreased from 1.9 percent to 1.0 percent. The oil and phosphatide fraction, including free fatty acid, had decreased from 2.4 percent to 1.8 percent.

*Example 3*

In an experiment similar to Example 1, a sample of recycle alcohol was taken. To this sample was added 2 g. of calcium oxide per liter, the mixture stirred hot for 15 minutes. After filtration of insolubles, the free fatty acids were reduced from 0.145 percent to 0.03 percent.

The determinations represented in Examples 2 and 3 may be integrated to form the basis of individual alkaline treatments in an experiment such as described in Example 1. Likewise, they may be employed to form the basis of combined treatment in which the lime is added to the hot miscella, as shown in the accompanying drawing.

*Example 4*

This example illustrates the increased solvent efficiency of an alcoholic solvent that has been given an alkaline treatment with an alkali metal hydroxide.

A 6-stage cocurrent extraction of soybean flakes with untreated recycle alcohol was compared with an exactly similar extraction with the same kind of recycle alcohol, but which had been alkali treated as in Example 2. The amount of residual (A. O. C. S. method) in the washed spent flakes leaving the extractor was 5.0 percent for those extracted with untreated recycle alcohol, while those extracted with the treated recycle alcohol (as in Example 2) contained only 3.6 percent.

Instead of employing the alkali treated recycle alcohol, the same increased efficiency is gained by adding 0.5 to 3.0 g. per liter of the alkali metal hydroxide to fresh alcoholic solvent as a pretreatment. The added alkali, or residual alkalinity, whichever the case may be, eventually is present, not in the chemical form of alkali metal hydroxide, but rather principally as alkali metal soaps of the free fatty acids of the oil with which the treated solvent comes in contact. It is to be understood that the term, alkali metal hydroxide treatment, or alkali metal hydroxide pretreatment, includes the presence and use of the corresponding alkali metal soaps, since this is a variation that will readily occur to those skilled in the art.

I claim:

1. A process for extracting alcohol-soluble oils from a material of the group consisting of vegetable seeds and nut meats, comprising subjecting the said material to extraction with hot alcohol, withdrawing the alcoholic solution, cooling the latter to a temperature that is not above 20° C. to cause the separation of oil and solids, and separating the alcoholic solution from the oil and solids, treating the separated alcoholic solution with an alkaline agent thus to cause purification of the solvent by separation of insoluble material, removing the separated insoluble material, and re-using the thus purified alcoholic solution in the extraction process without subjecting the latter solution to distillation refinement to extract a fresh batch of the material.

2. The process of claim 1 in which the alkaline treatment comprises a first treatment with alkali metal hydroxide.

3. The process of claim 1 in which the alkaline treatment comprises a first treatment with alkali metal hydroxide, followed by a second treatment with an alkaline earth metal oxide.

4. The process of claim 1 in which the alcoholic solution prior to cooling is treated with lime to cause precipitation of calcium soaps of free fatty acids and said free fatty acid soaps are removed.

5. The process of claim 4 in which the alkaline agent employed in treating the separated alcoholic solution is an alkali metal hydroxide.

6. The process of claim 1 in which the separated alcoholic solution, treated with an alkaline agent, comprises a bled-off circulating stream.

7. A process for extracting oils from material of the group consisting of vegetable seeds and nut meats, comprising subjecting the said material to extraction with a hot alcoholic solvent, withdrawing the extract solution, cooling the latter to a temperature sufficiently low to cause the separation of oil and solids, and separating the solvent solution from the oil and solids, treating the separated solvent solution with an alkaline agent thus to cause separation of insoluble material, removing the separated insoluble material, and re-using the resulting solvent solution in the extraction process without subjecting the latter solution to distillation refinement to extract a fresh batch of said material.

8. The process of claim 7 wherein the alkaline agent is alkali metal hydroxide.

RICHARD H. WESTERGAARD.

References Cited in the file of this patent

UNITED STATES PATENTS

| Number | Name | Date |
|---|---|---|
| 2,080,111 | Bump | May 11, 1937 |
| 2,260,731 | Thurman | Oct. 28, 1941 |
| 2,524,037 | Beckel et al. | Oct. 3, 1950 |
| 2,533,754 | Ballard et al. | Dec. 12, 1950 |